(12) United States Patent
Choi et al.

(10) Patent No.: US 10,175,764 B2
(45) Date of Patent: *Jan. 8, 2019

(54) METHOD OF CONTROLLING AN OPERATION OF A CAMERA APPARATUS AND A CAMERA APPARATUS

(71) Applicant: Samsung Electronics Co., Ltd., Gyeonggi-do (KR)

(72) Inventors: Sung-Do Choi, Gyeonggi-do (KR); Moon-Sik Jeong, Gyeonggi-do (KR); Ivan Koryakovskiy, Gyeonggi-do (KR); Arin Jumpasut, Seoul (KR)

(73) Assignee: Samsung Electronics Co., Ltd (KR)

( * ) Notice: Subject to any disclaimer, the term of this patent is extended or adjusted under 35 U.S.C. 154(b) by 396 days.

This patent is subject to a terminal disclaimer.

(21) Appl. No.: 14/169,740

(22) Filed: Jan. 31, 2014

(65) Prior Publication Data

US 2014/0218283 A1 Aug. 7, 2014

(30) Foreign Application Priority Data

Feb. 1, 2013 (KR) .......................... 10-2013-0011959

(51) Int. Cl.
*G06F 3/01* (2006.01)
*H04N 5/232* (2006.01)

(52) U.S. Cl.
CPC .......... *G06F 3/017* (2013.01); *H04N 5/23219* (2013.01)

(58) Field of Classification Search
None
See application file for complete search history.

(56) References Cited

U.S. PATENT DOCUMENTS 6,944,315 B1 * 9/2005 Zipperer ............ G06K 9/00342
348/169
8,537,231 B2 * 9/2013 Mekenkamp ........... G06F 3/017
348/222.1
(Continued)

FOREIGN PATENT DOCUMENTS

CN 101742114 6/2010
CN 102055844 5/2011
(Continued)

OTHER PUBLICATIONS

Chinese Office Action dated Sep. 5, 2017 issued in counterpart application No. 201410043169.5, 18 pages.
(Continued)

*Primary Examiner* — Kent W Chang
*Assistant Examiner* — Nathaniel P Brittingham
(74) *Attorney, Agent, or Firm* — The Farrell Law Firm, P.C.

(57) ABSTRACT

A method and apparatus for controlling an operation of a camera that allows a user to conveniently control a camera apparatus according to a gesture of a subject input through a lens of a camera, and the camera apparatus are provided. The method includes receiving an image input through a camera lens; generating an image frame; detecting a motion of a subject included in the image frame by comparing the image frame with at least one previous frame stored before the image frame is generated; determining whether the motion of the subject is a User Interface (UI) gesture; and performing, if the motion is the UI gesture, an operation corresponding to the UI gesture.

8 Claims, 15 Drawing Sheets

(56) References Cited

U.S. PATENT DOCUMENTS

| | | | |
|---|---|---|---|
| 2007/0252898 A1 | 11/2007 | Delean | |
| 2009/0228841 A1* | 9/2009 | Hildreth | G06F 3/0304 |
| | | | 715/863 |
| 2010/0013943 A1* | 1/2010 | Thorn | H04N 5/232 |
| | | | 348/222.1 |
| 2010/0159981 A1 | 6/2010 | Chiang et al. | |
| 2011/0018795 A1* | 1/2011 | Jang | G06F 3/0304 |
| | | | 345/156 |
| 2012/0070036 A1* | 3/2012 | Lee | G06K 9/00375 |
| | | | 382/103 |
| 2012/0225719 A1* | 9/2012 | Nowozin | G06K 9/00342 |
| | | | 463/36 |
| 2012/0275648 A1* | 11/2012 | Guan | H04N 5/23219 |
| | | | 382/103 |
| 2013/0041243 A1* | 2/2013 | Byrd | G06T 19/003 |
| | | | 600/374 |
| 2013/0222232 A1* | 8/2013 | Kong | G06F 3/011 |
| | | | 345/156 |

FOREIGN PATENT DOCUMENTS

| | | |
|---|---|---|
| CN | 102693007 | 9/2012 |
| JP | 2002033951 | 1/2002 |
| WO | WO 2012/011614 | 1/2012 |

OTHER PUBLICATIONS

European Search Report dated Nov. 2, 2017 issued in counterpart application No. 14153056.8-1908, 4 pages.

* cited by examiner

METHOD OF CONTROLLING AN OPERATION OF A CAMERA APPARATUS AND A CAMERA APPARATUS

PRIORITY

This application claims priority under 35 U.S.C. § 119(a) to Korean Application Serial No. 10-2013-0011959, which was filed in the Korean Intellectual Property Office on Feb. 1, 2013, the entire content of which is incorporated herein by reference.

BACKGROUND OF THE INVENTION

1. Field of the Invention

The present invention relates generally to a camera, and more particularly, to a method and apparatus of controlling an operation of a camera according to a gesture of a subject input through a lens of the camera.

2. Description of the Related Art

A digital image processing apparatus generally refers to all apparatuses that process an image of a digital camera, such as a Personal Digital Assistant (PDA), a phone camera, etc., and/or apparatus that use an image recognition sensor. A digital image processing apparatus can process an image received through an imaging device via a digital signal processor, compress the received image, generate an image file based upon the received image, and then store the generated image file in a memory.

As major consumers of digital cameras have extended from a few specialists to the general public, the age range and use field of consumers of digital cameras has expanded. In particular, consumers of digital cameras in ages ranging from the teens to the thirties frequently take pictures of themselves by using the camera. However, when users take pictures of themselves, it is not easy for the users to press a shutter of the camera while focusing on themselves. Further, while a lens is typically disposed on a front surface of the digital camera, a menu button for changing a setting of the camera is disposed on a rear surface of the camera. When a user takes a self-picture through the camera, since the user acts as the subject, the user must be located in front of the camera. Accordingly, it becomes more difficult for the user to use desired functions of the digital camera while taking the self-picture.

SUMMARY OF THE INVENTION

An aspect of the present invention is to provide a method of controlling an operation of a camera apparatus according to a gesture of a subject input through a lens of a camera, and the camera apparatus.

In accordance with an aspect of the present invention, a method of controlling an operation of a camera apparatus is provided. The method includes receiving an image input through a camera lens and generating an image frame based on the image; detecting a motion of a subject included in the image frame by comparing the image frame with at least one previous frame stored before the image frame is generated; determining whether the motion of the subject is a User Interface (UI) gesture; and performing, if the motion is the UI gesture, an operation corresponding to the UI gesture.

In accordance with another aspect of the present invention, a method of controlling an operation of a camera apparatus is provided. The method includes receiving a first User Interface (UI) gesture from a subject; determining whether a second UI gesture is received from the subject within a reference time; determining, if the second UI gesture is received within the reference time, that the first UI gesture and the second UI gesture are a successive UI gesture; and performing an operation corresponding to the successive UI gesture.

In accordance with another aspect of the present invention, a camera apparatus is provided. The camera apparatus includes a camera configured to receive an image input from a cameras lens and generate an image frame based on the image; a gesture recognizer configured to compare the image frame with at least one previous frame pre-stored before the image frame is generated, and detect a motion of a subject included in the image frame based on a result of the comparison; and a controller configured to determine whether a motion of a subject is a User Interface (UI) gesture, and perform, if the motion is the UI gesture, an operation corresponding to the UI gesture.

BRIEF DESCRIPTION OF THE DRAWINGS

The above and other aspects, features, and advantages of certain embodiments of the present invention will be more apparent from the following detailed description taken in conjunction with the accompanying drawings, in which.

DETAILED DESCRIPTION OF EMBODIMENTS OF THE PRESENT INVENTION

Hereinafter, embodiments of the present invention are described with reference to the accompanying drawings. Various specific definitions found in the following description are included merely to help provide general understanding of the present invention, and embodiments of the present invention exclusively limited to such definitions.

Figure 1:
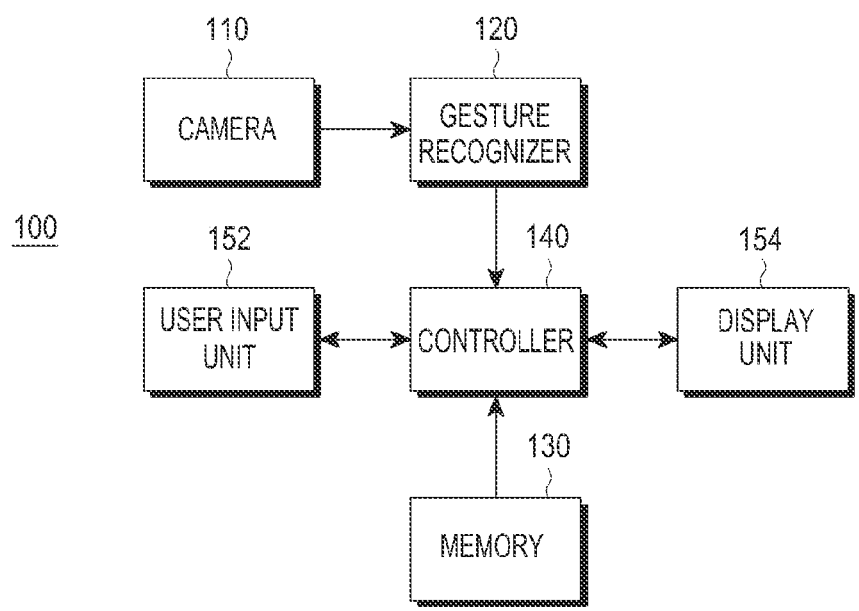
FIG. 1 is a block diagram illustrating a configuration of a camera apparatus according to an embodiment of the present invention.

FIG. 1 is a block diagram illustrating a configuration of a camera apparatus according to an embodiment of the present invention.

Referring to FIG. 1, a camera apparatus 100 includes a camera 110, a gesture recognizer 120, a memory 130, a controller 140, a user input unit 152, and a display unit 154.

The camera 110 receives an image provided through a lens (not shown). The camera 110 according to the present embodiment includes at least two lenses. The camera 110 can receive a User Interface (UI) gesture generated as a user who uses the camera apparatus 100 or a subject shot by the camera apparatus 100 moves. The camera 110 converts an image input through the lens to an image frame. The camera 110 can continuously store images input through the lens in the unit of frames in real time or temporarily store such images. The camera 110 can sequentially receive motions of the subject corresponding to one or more UI gestures from the subject.

Hereinafter, an image frame converted from a currently input image among image frames generated by the camera 110 is referred to as a "current frame" and an image frame before the current frame is generated is referred to as a "previous frame".

The gesture recognizer 120 detects a motion of the user or subject (i.e., a gesture) from images input through the camera 110. The gesture recognizer 120 compares the current frame generated by the camera 110 with at least one previous frame to determine the gesture of the user or subject.

The gesture recognizer 120 can detect the user or subject from image frames that are converted in real time through the camera 110. With respect of each of the image frames, the gesture recognizer 120 can generate frame data including data such as outline, brightness, saturation, color, coordinate and the like of various objects included in each of the image frames. The gesture recognizer 120 detects the subject by using the frame data with respect to each of the image frames. The gesture recognizer 120 can determine an object in which a preset number of image frames has not been changed in outline, brightness, saturation, color, and coordinate as the subject under a control of the controller 140.

According to an embodiment of the present invention, the term "user" corresponds to a person who performs the camera shooting by using the camera apparatus 100, and the "subject" corresponds to a person who is shot by the camera apparatus 100. The subject may include the user of the camera apparatus 100, such as during a self-shot, for example.

The gesture recognizer 120 compares at least one previous frame and the current frame in order to determine a motion of the subject included in each of the frames. The gesture recognizer 120 can determine the motion of the subject by comparing a predetermined number of frames pre-stored in the memory 130 or image frames input for a preset time, according to embodiments of the present invention.

The gesture recognizer 120 detects a motion area from the image. The "motion area" refers to an area where the motion of the subject is largest in the image frame. The gesture recognizer 120 can extract the motion area by comparing two or more image frames. The motion area includes at least a part of the image frame.

When the motion area is detected, the gesture recognizer 120 predicts a motion trace of the subject in the motion area under a control of the controller 140. The motion of the subject may not be entirely received through the lens of the camera 110 according the motion of the subject. For example, when the subject draws a circle by using a hand, a part of the circle drawn by the subject may extend beyond an angle of view of the lens and may not be input through the camera 110. As described above, when the motion of the subject is not entirely input through the lens of the camera 110, the gesture recognizer 120 is able to predict the motion trace of the subject in the motion area.

For example, a subject may draw a circle in previous frames generated before the current frame by using a right hand. The gesture recognizer 120 detects an area in which the right hand is moved by the subject as the "motion area" and recognizes that the right hand of the subject draws the circle in the motion area. Accordingly, the gesture recognizer 120 expands the current frame to predict the motion trace along which the circle is drawn in an area where the right hand of the subject escapes from the angle of view of the camera 110 under a control of the controller 140.

Herein, a gesture for requesting an operation of the camera apparatus 100 among gestures recognized by the gesture recognizer 120 is referred to as a "UI gesture". For example, a subject may draw a circle by using the right hand, and then the lens of the camera 110 may be zoomed-in. In the above example, an action in which the subject draws the circle corresponds to the UI gesture.

The gesture recognizer 120 can detect UI gestures successively input from the subject in the motion area through the lens of the camera 110. For example, the gesture recognizer 120 can sequentially detect a first gesture and a second gesture of the subject in the motion area. For example, the subject may provide a UI gesture corresponding to zoom-in and then provide another UI gesture corresponding to a camera shooting operation. In this case, the camera apparatus 100 receives the first gesture and the second gesture as UI gestures and sequentially performs a zoom-in operation and a camera shooting operation. As described above, two or more UI gestures sequentially input through the camera 110 are referred to as a "successive UI gesture".

According to an embodiment of the present invention, the successive UI gesture may be input to the camera 110 to perform a particular operation that can be performed by the camera apparatus 100 and perform the particular operation in stages. For example, when the successive UI gesture includes the first gesture and the second gesture, the first gesture may be a UI gesture for requesting a zoom-in, and the second gesture may be a UI gesture corresponding to a magnification value (for example, "three times") of the zoom-in/out. For example, when the subject moves in an order of "the first gesture→the second gesture" and the controller 140 determines that the first gesture and the second gesture are a successive UI gesture, the controller 140 can control the camera apparatus 100 to 3× zoom-in on the subject of the shooting through the camera 110. According to another embodiment of the present invention, the first gesture may be a gesture for making a request for zoom-in and the second gesture may be a UI gesture corresponding to a magnification value (for example, "⅓ times"). It is assumed that the first gesture and the second gesture are sequentially input as the subject moves in the order of "the first gesture→the second gesture". The controller 140 can control the camera apparatus 100 to perform zoom-out by reducing a size of the subject shot through the camera 110 by ⅓.

According to another embodiment of the present invention, the first gesture may correspond to "2× zoom-in" of zoom-in operations and the second gesture may correspond to the "3× zoom-in". In this case, the subject is moved in the order of "the first gesture→the second gesture" and the controller 140 determines the gestures as the successive UI gesture. After first 2× zoom-in on the subject shot through the camera 110, the controller 140 can control the camera apparatus 100 to 3× zoom-in the 2× zoomed-in subject. Accordingly, the initial subject may be "2×3 times" (i.e., 6×) zoomed-in.

According to an embodiment of the present invention, even when a motion of the subjection is not entirely input through the lens of the camera 110, the gesture recognizer 120 can predict a motion trace of the subject. For example, when the subject inputs a UI gesture of drawing a circle by using a hand, before completing the 360° circle, the gesture recognizer 120 detects the motion of the subject input through the camera 110, predicts the motion trace along which the hand of the subject moves, and determines that the subject drew the circle of 360°.

For example, the gesture recognizer 120 may consider that the subject drew the 360° circle even though the subject has drawn only 330° of the 360° circle. Further, the motion of the subject considered as described above may be detected by the gesture recognizer 120 as a UI gesture.

Various data for controlling operations of the camera apparatus 100 is stored in the memory 130. Image frames input in real time through the camera 110 may be stored in the memory 130 for either temporary or long-term storage. Further, the memory 130 stores various UI gestures and operations of the camera apparatus 100 corresponding to the UI gestures. The memory 130 stores a successive UI gesture and various operations of the camera apparatus 100 corresponding to the successive UI gesture. Further, the memory 130 stores a reference time to determine whether the UI gestures are successively input (i.e., whether the successive UI gesture is input). For example, when the second gesture is input within the reference time after the first gesture is recognized by the gesture recognizer 120, the controller 140 determines that the first gesture and the second gesture are a successive UI gesture.

Herein, the term "UI gesture" refers to a gesture provided for executing a particular operation by the camera apparatus among motions of the subject detected by the gesture recognizer 120. The UI gesture includes, for example, gestures for performing zoom-in, zoom-out, shooting, increasing/decreasing a shutter speed, increasing/decreasing International Organization for Standardization (ISO) setting, controlling white balance, controlling a focus position, identifying whether a continuous shooting is performed, controlling a color temperature, identifying existence or non-existence of the use of a flash, and selecting a shoot mode.

The shoot mode includes, for example, at least one of a program Auto Exposure (AE) mode, a shutter priority AE mode, an aperture priority AE mode, a manual exposure mode, and a bulb exposure mode.

The controller 140 controls general operations of the camera apparatus 100.

The controller 140, according to an embodiment of the present invention, determines whether the motion of the subject detected from the gesture recognizer 120 is the UI gesture. When the UI gesture is detected by the gesture recognizer 120, the controller 140 controls the camera apparatus 100 to perform an operation corresponding to the corresponding UI gesture.

The controller 140 controls the camera apparatus 100 to perform an operation corresponding to each of the UI gestures included in the successive UI gesture according to the successive UI gesture.

For example, when the first gesture is a request for a zoom-in and the second gesture is a request for an operation corresponding to a magnification of zoom-in/out.

When the first gesture is detected by the gesture recognizer 120 and the second gesture is input from the subject just after the first gesture is input, the controller 140 determines the first gesture and the second gesture as a "successive UI gesture". The controller 140 controls the camera apparatus 100 to perform operations corresponding to the successive UI gesture.

The controller 140 determines whether the second gesture is input from the subject within a reference time just after the first gesture is input. When the second gesture is not input within the reference time, the controller 140 determines that the first gesture and the second gesture are separate UI gestures. When the second gesture is input within the reference time, the controller 140 determines that the first gesture and the second gesture are a successive UI gesture.

The user input unit 152 receives a user input received by the camera apparatus 100. The user input unit 152 receives the user input for receiving the UI gesture.

The user input unit 152 receives the user input corresponding to a motion area. For example, when the user input unit 152 receives an "arm" of a subject's body as a main motion area from the user, the gesture recognizer 120 first analyzes whether an area including the arm of the subject is the motion area of the image frame. As described above, when the motion area is preset by the user, the gesture recognizer 120 detects the motion area within a reduced amount of time.

The display unit 154 displays various data of the camera apparatus 100. According to an embodiment of the present invention, the display unit 154 displays an image input in real time through the lens of the camera 110 by using a touch screen or another corresponding device installed in the display unit 154. Further, the display unit 154 displays a picture file stored in the memory 130.

The display unit 154 displays a UI gesture input in real time through the lens of the camera 110.

Figure 2:
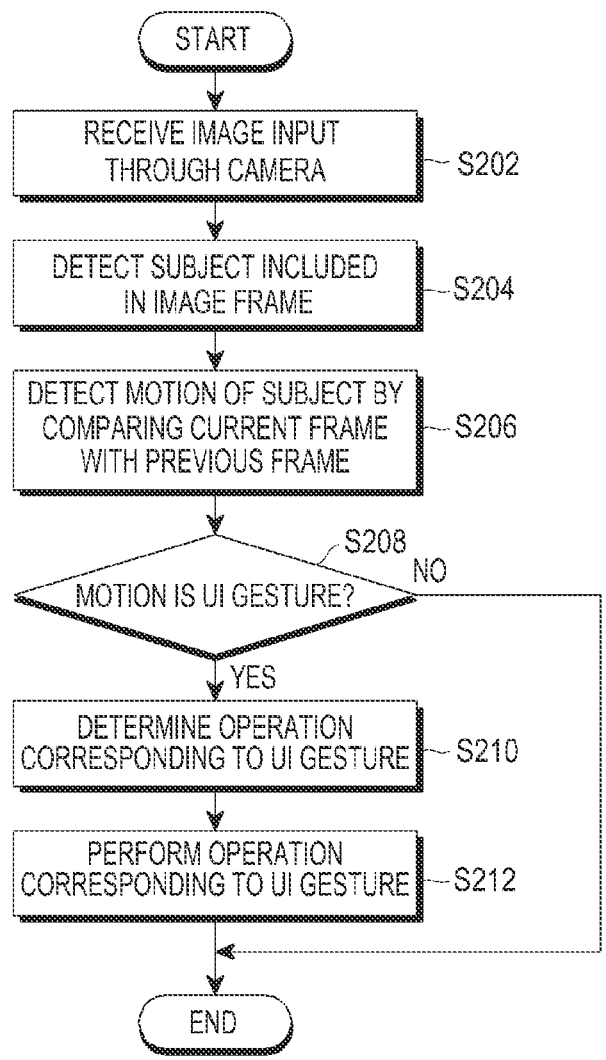
FIG. 2 is a flowchart illustrating an example of a method of controlling an operation of the camera apparatus illustrated in FIG. 1.

FIG. 2 is a flowchart illustrating an example of a method of controlling operations of the camera apparatus illustrated in FIG. 1.

Referring to FIG. 2, the camera apparatus 100 receives an image input through the camera 110, in step S202. The camera 110 generates an image frame by using the image input in step S202 and transmits the generated image frame to the gesture recognizer 120. With respect to the present example, the generated image frame is referred to as a "current frame" and an image frame generated before the current frame is referred to as a "previous frame".

The gesture recognizer 120 detects a subject included in the current frame, in step S204. In step S206, the gesture recognizer 120 compares the current frame with at least one previous frame to detect a motion of the subject detected in step S204.

In step S208, when the motion of the subject is detected, the controller 140 determines whether the motion of the subject detected in step S206 is the UI gesture. In step S210, when the motion of the subject is the UI gesture as a result of the determination of step S208, the controller 140 determines an operation corresponding to the detected UI gesture. The controller 140 can determine the operation corresponding to the UI gesture by searching the memory 130.

When the operation corresponding to the UI gesture is determined, the controller 140 executes the operation corresponding to the UI gesture by controlling the camera apparatus 100, in step S212.

Figure 3:
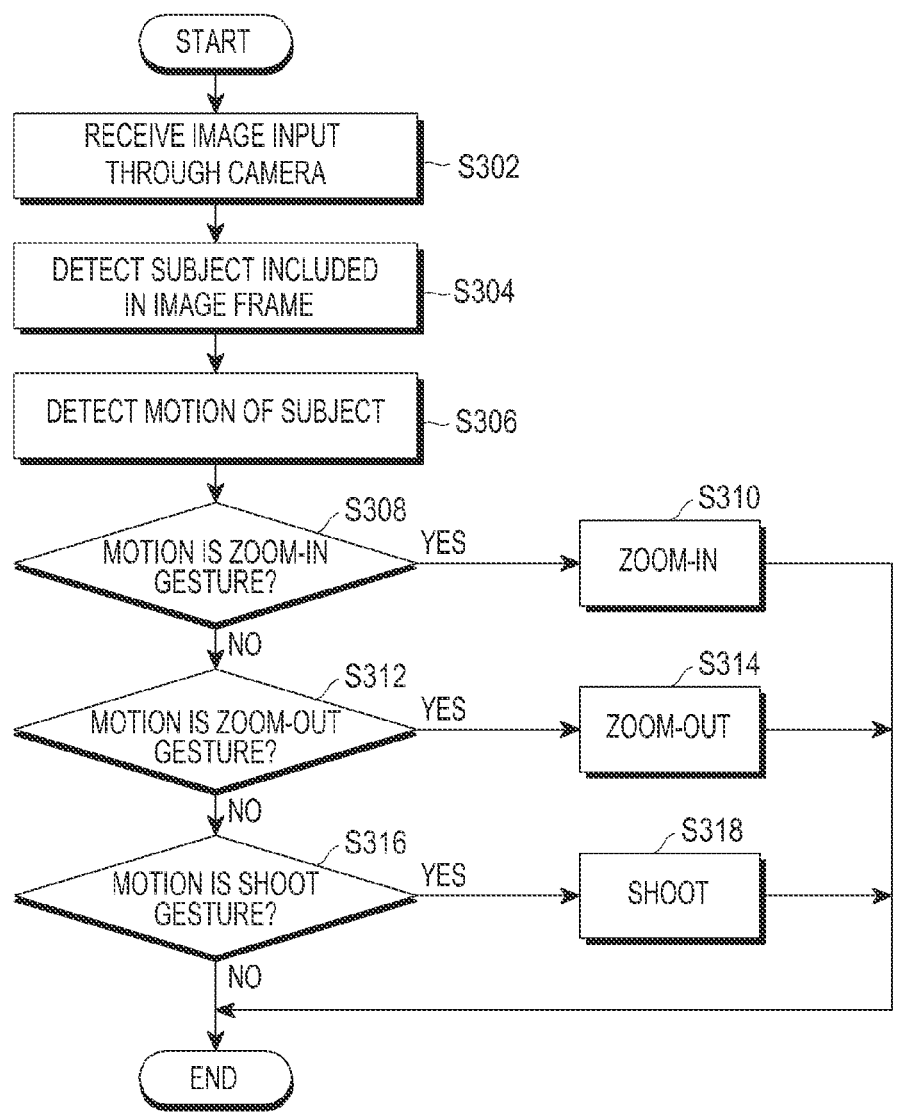
FIG. 3 is a flowchart illustrating another example of the method of controlling the operation of the camera apparatus illustrated in FIG. 1.

FIG. 3 is a flowchart illustrating another example of the method of controlling the operations of the camera apparatus illustrated in FIG. 1.

Referring to FIG. 3, the camera apparatus 100 receives an image input through the camera 110 in step S302. The camera 110 generates an image frame by using the image input in step S302 and transmits the generated image frame to the gesture recognizer 120.

The gesture recognizer 120 detects a subject included in the image frame, in step S304. The gesture recognizer 120 compares the current frame with at least one previous frame to detect a motion of the subject detected in step S304 in step S306.

When the motion of the subject is detected, the controller 140 determines whether the motion of the subject detected in step S306 is a zoom-in gesture, in step S308. When the motion of the subject is determined to be a zoom-in gesture as a result of the determination of step S308, the controller 140 performs a zoom-in operation by controlling the camera apparatus 100 in step S310. Accordingly, an image of the zoomed-in subject is displayed in the display unit 154.

Upon a determination that the motion of the subject is not the zoom-in gesture as a result of the determination of step S308 (S308: no), the controller 140 determines whether the motion detected in step S306 is a zoom-out gesture, in step S312. Upon a determination that the motion is the zoom-out gesture as a result of the determination of step S312 (S312: yes), the controller performs a zoom-out operation by controlling the camera apparatus 100 in step S314. Accordingly, an image of the zoomed-out subject is displayed in the display unit 154.

Upon a determination that the motion is not the zoom-out gesture as a result of the determination of step S312 (S312: no), the controller 140 determines whether the motion detected in step S306 is a shoot gesture in step S316. Upon a determination that the motion is the shoot gesture as a result of the determination of step S316 (S316: yes), the controller 140 performs a shoot operation by controlling the camera apparatus 100 in step S318. Accordingly, the camera 110 converts the image frame input through the lens (i.e., the current frame) to an image file and stores the image file in the memory 130. Further, under a control of the controller 140, the camera apparatus 100 displays the image file stored in the memory 130 through the display unit 154.

Although the present example according to an embodiment of the present invention follows an order in which the controller 140 determines whether the motion of the subject detected in step S306 is the zoom-in gesture, determines whether the motion of the subject is the zoom-out gesture, and then determines whether the motion of the subject is the shoot gesture, types of the UI gestures may be determined according to another order in accordance with other embodiments of the present invention. According to another embodiment, the controller 140 can search for the same UI gesture as the motion of the subject detected in step S306 in the memory 130.

Figure 4:
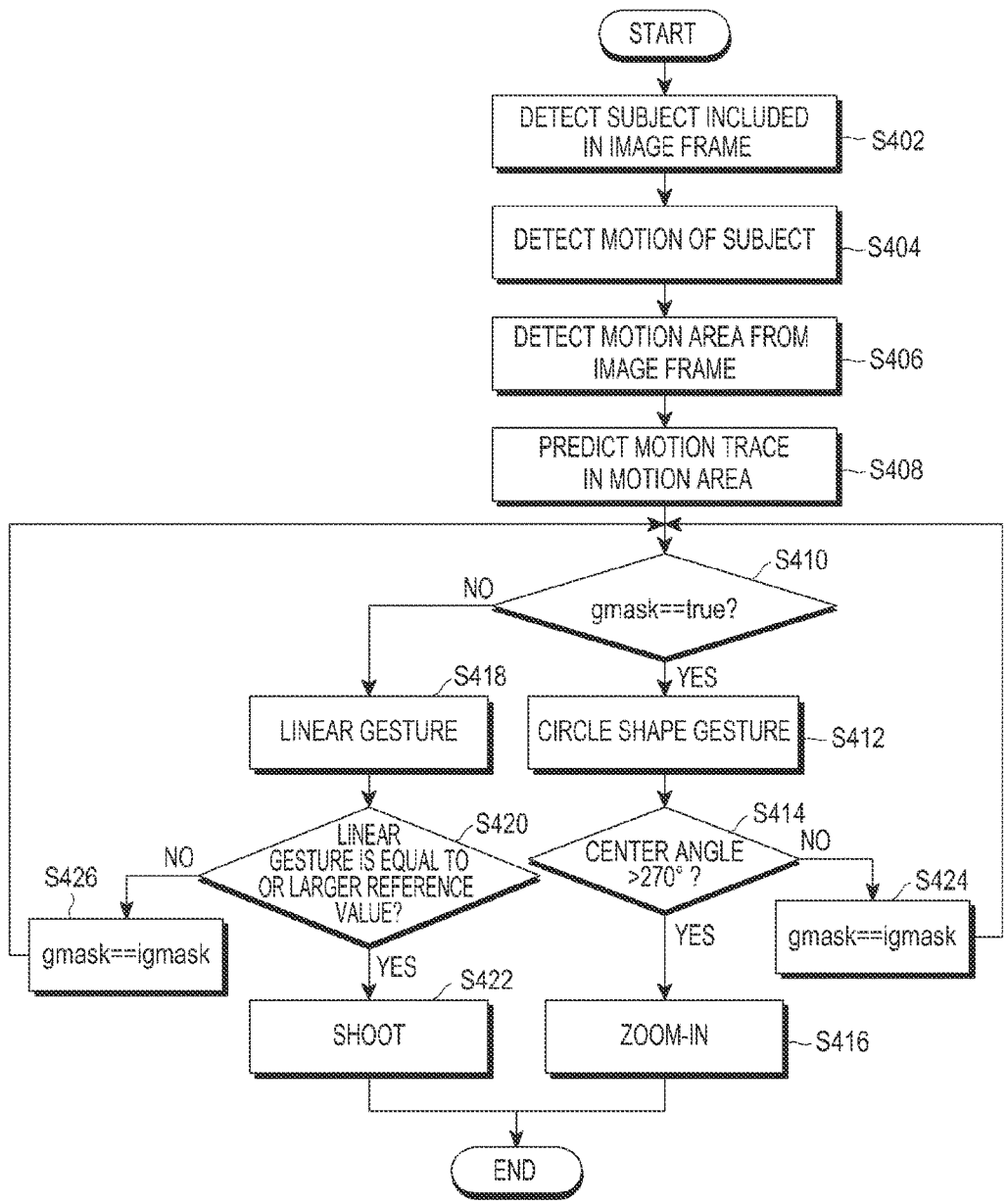
FIG. 4 is a flowchart illustrating another example of the method of controlling the operation of the camera apparatus illustrated in FIG. 1.

FIG. 4 is a flowchart illustrating another embodiment of the method of controlling the operations of the camera apparatus illustrated in FIG. 1. In the example according to FIG. 4, the UI gesture input to the camera apparatus 100 is the UI gesture for shooting or zoom-in operation.

Further, in the example according to FIG. 4, a value for determining a type of UI gesture of the subject input through the camera 110 (i.e., gmask) is set as true(=1). More specifically, the value true(=1) is already stored in the memory 130 as the gmask.

In the present example a circle shape gesture is the UI gesture for the zoom-in operation and a linear gesture is the UI gesture for the shooting operation. In the present example, a value of the motion trace predicted by the gesture recognizer 120 is "1" when the circle shape gesture is performed, and the value is "0" when the linear gesture is performed. The camera apparatus 100 receives an image input through the camera 110. The camera 110 generates an image frame by using the image input through the camera 110 and transmits the generated image frame (i.e., the current frame) to the gesture recognizer 120.

The gesture recognizer 120 detects a subject included in the image frame in step S402. In step S404, the gesture recognizer 120 detects a motion of the subject detected in step S402. When the motion of the subject is detected, the gesture recognizer 120 detects an area in which the subject moves (i.e., a motion area), in step S406. When the motion area is detected, the gesture recognizer 120 predicts a motion trace of the subject in the motion area, in step S408. Herein, "motion trace" refers to a movement path along in which at least a part of the subject moves within the image frames according to the motion of the subject. The gesture recognizer 120 predicts a motion of the subject within the first and second motion areas based on the first motion areas included in the previous frames and the second motion area included in the current frames.

According to an embodiment of the present invention, the controller 140 predicts whether the motion trace is a circle shape gesture (=true) or a linear gesture (=false) in step S408. Accordingly, in step S410, the controller 140 compares gmask with the value (true or false) predicted in step S408.The controller 140 determines whether the gmask is true(=1), in step S410. In step s412, upon a determination that gmask is true as a result of the determination of step S410 (S410: yes), the controller 140 determines that the motion of the subject detected in step S404 is the circle shape gesture. The circle shape gesture is a gesture in which the motion trace of the subject detected by the camera apparatus 100 has a circle shape. The subject can input the circle shape gesture into the camera 110 by performing an operation of drawing a circle or oval shape by using a hand.

The controller 140 determines whether a center angle of the circle shape gesture (i.e., the circle drawn by the subject) is 270° or greater, in step S414. The determination of whether the center angle of the circle is 270° or larger is performed in order to determine whether a circle drawn by the subject as the circle shape gesture even when the subject has not completely drawn the circle or when a part of the circle drawn by the subject escapes from the angle of view. Accordingly, the center angle 270° of the circle becomes a reference value for determining whether the motion input by the subject is a motion included in the UI gesture. According to an embodiment of the present invention, the center angel of the circle may include various values such as 180°, 360°, etc. The center angle is an angle of an arc of the circle drawn by the subject with respect to a center of the circle. In the present example, the controller 140 recognizes the motion of the subject as the UI gesture corresponding to the circle shape gesture when the center angel 270° or greater and performs an operation corresponding to the circle shape gesture.

Upon a determination that the center angle is 270° or greater as a result of the determination of step S414 (S414: yes), the controller 140 performs the zoom-in operation by controlling the camera apparatus 100, in step S416.

Upon a determination that the center angle is less than 270° as a result of the determination of step S414 (S414: no), the controller 140 changes the gmask into a reverse value of true, that is, false(=0), in step S424. Accordingly, when the center angle is less than 270°, controller 140 determines that the UI gesture is not a circle shape gesture. Accordingly, the controller 140 can determine whether the UI gesture corresponds to the linear gesture. The controller 410 also controls the camera apparatus 100 to perform an operation corresponding to the linear gesture by repeating steps S410 to S422.

Upon a determination that the gmask is not true(=1) as a result of the determination of step S410 (S410: no), that is, the gmask is false(=0), the controller 140 determines that the motion of the subject detected in step S404 is the linear gesture, in step S418. The linear gesture refers to a gesture in which a linear motion of the subject input through the lens of the camera 110. For example, the subject can input the linear gesture into the camera 110 by drawing a line from a left side to a right side or from a right side to a left side by using a hand. The subject can also input the linear gesture into the camera 110 by drawing a line from an upper side to a lower side or from a lower side to an upper side.

The controller 140 determines whether the linear gesture is equal to or larger than a reference value, in step S420. At this time, the reference value is also used to determine whether a line drawn by the subject is a linear gesture, even when the line has not been completely drawn or at least a part of the line extends beyond the angle of view during a process in which the subject draws the line. For example, a line having a length of at least 30 cm drawn by the hand of the subject from a left side to a right side may be determined to be a linear gesture. When the line drawn by the subject becomes at least 25 cm, the controller 140 of the camera apparatus 100 determines that the line is a linear gesture. In step S420, 25 cm may be the reference value, for example.

Upon a determination that a length of the line is equal to or larger than the reference value as a result of the determination of step S420 (S420: yes), the controller 140 performs a shooting operation by controlling the camera apparatus 100, in step S422. Upon a determination that the length of the line is less than the reference value as a result of the determination of step S420 (S420: no), the controller 140 reverses the value of gmask, in step S426. Since a center angle is less than 270°, controller 140 determines that the UI gesture is not the circle shape gesture. Accordingly, the controller 140 can determine whether the UI gesture corresponds to the circle shape gesture. The controller 410 can control the camera apparatus 100 to perform an operation corresponding to the circle shape gesture by repeating steps S410 to S416.

Figure 5:
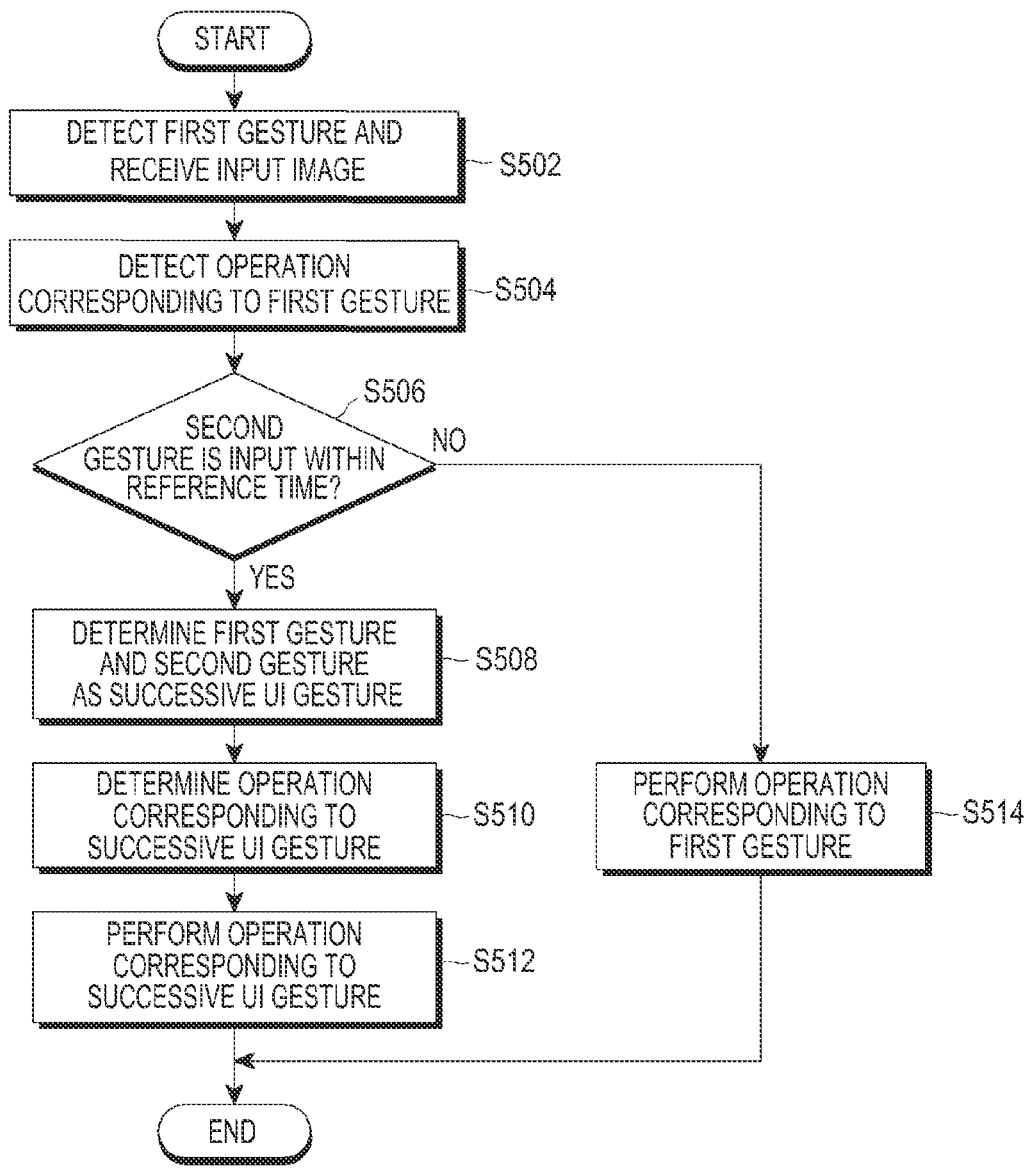
FIG. 5 is a flowchart illustrating another example of the method of controlling the operation of the camera apparatus illustrated in FIG. 1.

FIG. 5 is a flowchart illustrating another example of the method of controlling the operations of the camera apparatus illustrated in FIG. 1.

Referring to FIG. 5, the gesture recognizer 120 of the camera apparatus 100 detects a first gesture as the UI gesture, in step S502.

Before performing step S502, the camera apparatus 100 detects at least one UI gesture input through the camera 110. A process in which the gesture recognizer 120 detects the UI gesture is described as follows. The camera 110 generates an image frame by using an image input through the lens. Next, the camera 110 transmits the image frame, (i.e., the current frame) to the gesture recognizer 120. The gesture recognizer 120 detects a subject included in the image frame. Next, the gesture recognizer 120 detects a motion area in the image frame. When the motion area is detected, the gesture recognizer 120 determines a motion trace of the subject in the motion area. The gesture recognizer 120 can determine a motion of the subject within first and second motion areas based on the first motion areas included in previous frames and the second motion area included in current frames. In the present example, the process in which the gesture recognizer 120 detects the UI gesture is omitted for convenience.

When a first gesture is detected, the controller 140 determines which operation corresponds to the first gesture, in step S504. The controller 140 determines whether a second gesture is input within a reference time, in step S506.

Upon a determination that the second gesture is not input within the reference time as a result of the determination of step S506 (S506: no), the camera apparatus 100 performs only the operation corresponding to the first gesture, in step S514.

Upon a determination that the second gesture is input within the reference time as a result of the determination of step S506 (S506: yes), the controller 140 determines that the first gesture and the second gesture are a successive UI gesture, in step S508. The controller 140 determines an operation corresponding to the successive UI gesture, in step S510. The camera apparatus 100 performs the operation corresponding to the successive UI gesture, in step S512.

In the present example, the operation corresponding to the UI gesture including one gesture may be different from the operation corresponding to the successive UI gesture including at least two gestures. For example, the operation corresponding to the first gesture may be a zoom-in operation, and the operation corresponding to the successive UI gesture including the first gesture and the second gesture may be a shooting mode change operation of the camera apparatus 100. According to the above example, when only the first gesture is input from the subject through the camera 110, the camera apparatus 100 performs the zoom-in operation. When the successive UI gesture, in which the first gesture and the second gesture are successively input, is input by the subject, the camera apparatus 100 changes the shooting mode.

FIGS. 6A to 6D are diagrams illustrating UI gestures according to an embodiment of the present invention. In the example of FIGS. 6A to 6D, the subject is a user of the camera apparatus 100.

Figure 6A:
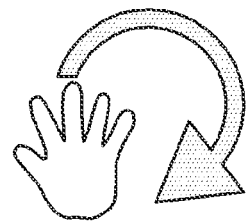
FIGS. 6A to 6D are diagrams illustrating User Interface (UI) gestures according to an embodiment of the present invention.
Figure 6B:
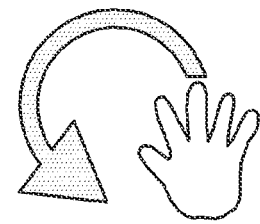

FIG. 6A corresponds to a zoom-in gesture requesting for a zoom-in operation, and FIG. 6B corresponds to a zoom-out gesture of requesting a zoom-out operation. When the subject performs the zoom-in gesture of rotating the hand clockwise, the camera apparatus 100 detects the zoom-in gesture and performs a zoom-in operation. When the subject performs the zoom-out gesture of rotating the hand counterclockwise, the camera apparatus 100 detects the zoom-out gesture and performs a zoom-out operation.

Figure 6C:
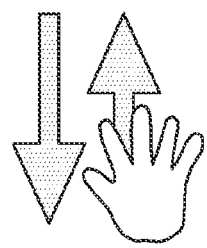
Figure 6D:
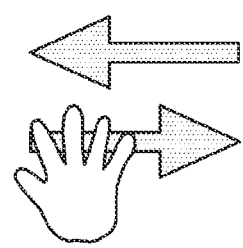

FIGS. 6C and 6D illustrate a vertical gesture and a horizontal gesture for requesting for a camera shooting operation. When the subject makes the vertical gesture of lowering or raising the hand in a vertical direction, the camera apparatus 100 detects the vertical gesture and performs a shooting operation. Further, when the subject makes the horizontal gesture of moving the hand from a right side to a left side or a left side to a right side in a horizontal direction, the camera apparatus 100 detects the horizontal gesture and shoots the subject.

As described above, the subject (i.e., the user can) zoom-in or zoom-out the lens of the camera 110 without a direct control of the camera apparatus 100 by making the motions corresponding to the UI gestures illustrated in FIGS. 6A and 6B. Further, the subject can control the camera apparatus 100 to shoot the subject itself without a direct control of the camera apparatus 100, by making the motions corresponding to the UI gestures illustrated in FIGS. 6C and 6D.

Figure 7A:
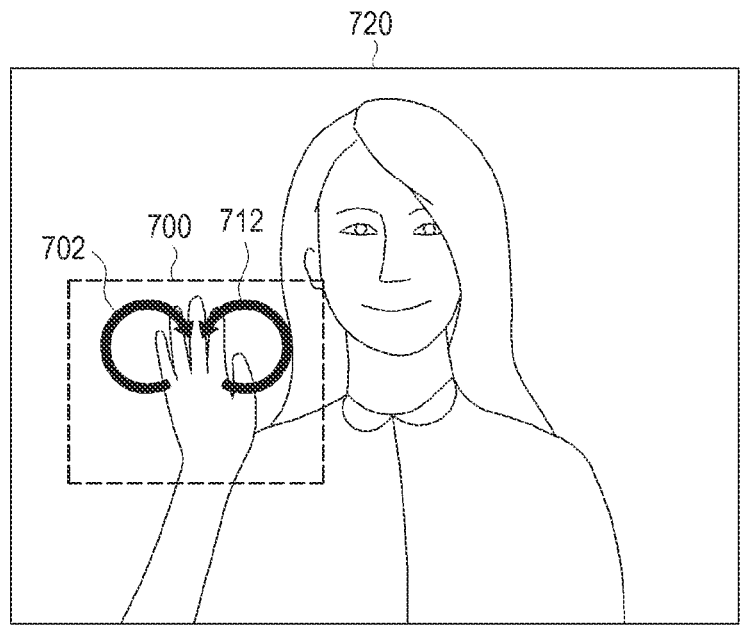
FIG. 7A is a diagram illustrating a UI gesture.
Figure 7B:
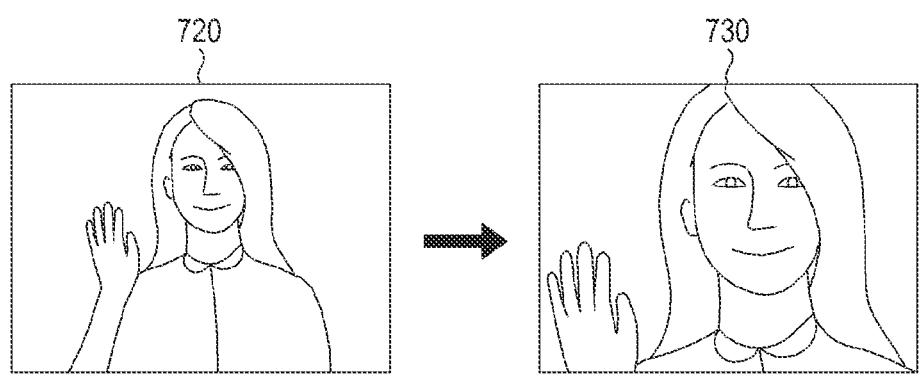
FIGS. 7B and 7C are diagrams of an image frame displayed on a display unit according to a successive UI gesture according to another embodiment of the present invention.
Figure 7B:
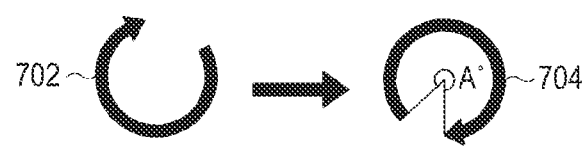
Figure 7C:
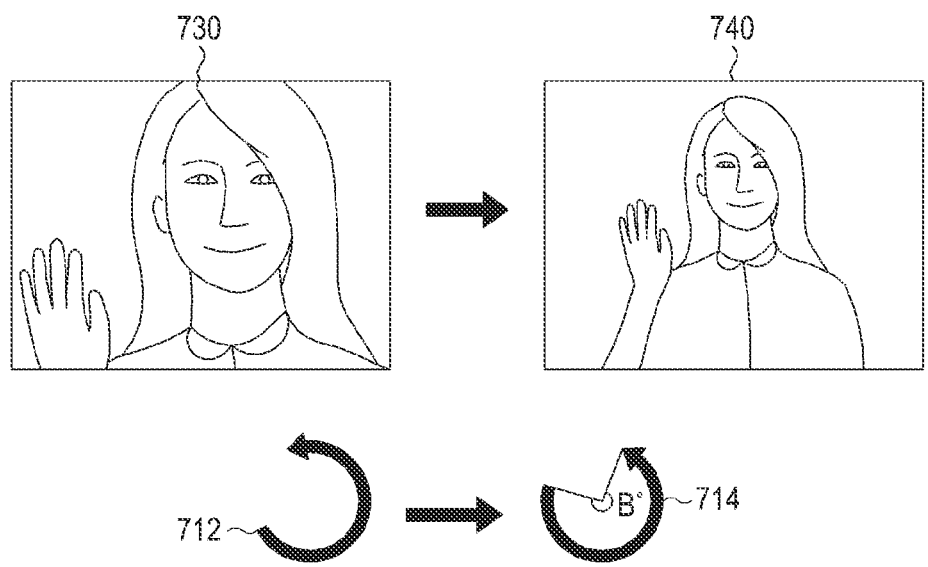

FIG. 7A is a diagram illustrating a UI gesture and FIGS. 7B and 7C are diagrams illustrating an image frame displayed on the display unit 154 according to a successive UI gesture according to another embodiment of the present invention. In the present example, each of successive UI gestures of FIGS. 7B and 7C is used to perform the zoom-in operation of the camera 110 and the zoom-out operation of the camera 110.

Referring to FIG. 7A, the gesture recognizer 120 detects a motion area 700 included in an image frame 720 (hereinafter, referred to an original frame) generated in real time through the camera 110, and traces or determines a motion of the subject in the motion area 700. In the present example, the subject inputs a ClockWise (CW) gesture 702 of rotating the hand clockwise or a CounterClockWise (CCW) gesture 712 of rotating the hand counterclockwise into the camera apparatus 100 as the UI gesture.

Referring to FIG. 7B, the subject inputs a second Clockwise (2CW) gesture 704 into the camera apparatus 100 just after inputting the first ClockWise (1CW) 702. It is assumed that the subject rotates the hand by a center angle of A° when making the 2CW gesture 704. As illustrated in FIG. 7B, the subject can input the successive UI gesture into the camera 110 by sequentially making the 1CW gesture 702 and the 2CW gesture 704.

The successive UI gesture of FIG. 7B is used to perform the zoom-in operation of the camera 110. The subject requests a zoom-in operation by making the 1CW gesture 702 and inputs a zoom-in magnification by making the 2CW gesture 704, which is successively performed with the 1CW gesture 702. In the example according to FIG. 7B, the magnification corresponds to a center angle of the 2CW gesture 704 and a magnification corresponding to A° is "three times". The controller 140 controls the camera 110 to 3× zoom-in the lens of the camera 110 and generates an image frame 730 (hereinafter, referred to as an "enlarged frame") when the lens of the camera 110 is 3× zoomed-in.

Referring to FIG. 7C, the subject inputs a second CounterClockWise (2CCW) gesture 714 into the camera apparatus 100 just after inputting the first CounterClockWise (1CCW) gesture 712. In the present example, the subject rotates the hand by a center angle of B° when performing the 2CCW gesture 714. As illustrated in FIG. 7C, the subject can input the successive UI gesture into the camera apparatus 100 by sequentially performing the 1CCW gesture 712 and the 2CCW gesture 714.

The successive UI gesture of FIG. 7C is used to perform the zoom-out operation of the camera 110. The subject requests the camera apparatus 100 to perform a zoom-out operation by making the 1CCW gesture 712 and inputs a zoom-out magnification into the camera apparatus 100 by making the 2CCW gesture 714, which is successively performed with the 1CCW gesture 712. In the example according to FIG. 7C, the magnification corresponds to a center angle of the 2CCW gesture 714 and a magnification corresponding to B° is "½ times". The controller 140 controls the camera 110 to ½× zoom-out the lens of the camera 110, and the camera 110 generates an image frame 740 (hereinafter, referred to as a reduced frame) when the lens is ½× zoomed-out.

Referring to FIG. 7C, when the 1CCW gesture 712 is input, the enlarged frame 730 is displayed on the display unit 154. As the 2CCW gesture 714 is input, the display unit 154 displays the reduced frame 740 of which the magnification is ½ reduced from the enlarged frame 730.

FIGS. 8A to 8D are diagrams illustrating the second UI gesture illustrated in FIG. 7B. FIGS. 8A to 8D all correspond to a second UI gesture performed in a circle shape input after the first UI gesture of FIG. 7B, i.e., after the 1CW gesture 702 is input into the camera apparatus 100 by the subject 800.

In the present example, the subject 800 can provide a request for zoom-in operations of different magnifications by drawing the second UI gestures in the circle shapes having different center angles by using the hand illustrated in FIGS. 8A to 8D.

Figure 8A:
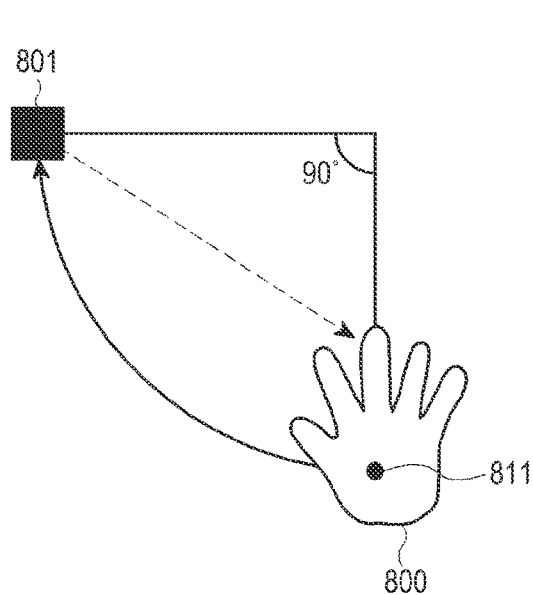
FIGS. 8A to 8D are diagrams illustrating a second UI gesture illustrated in FIG. 7B.
Figure 8B:
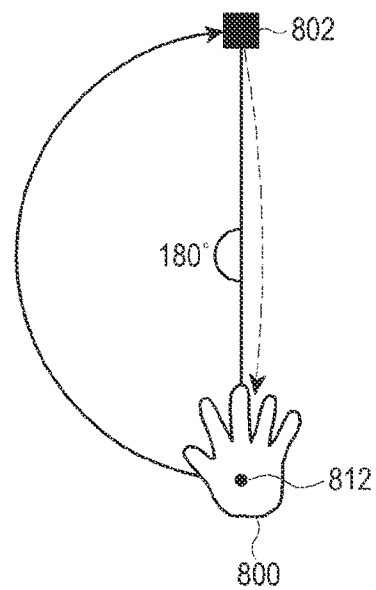
Figure 8C:
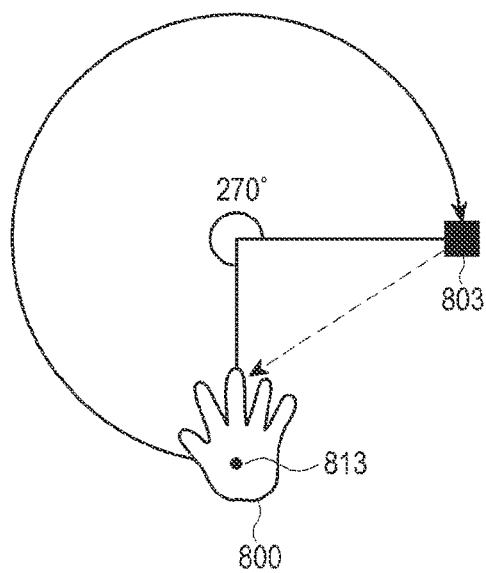
Figure 8D:
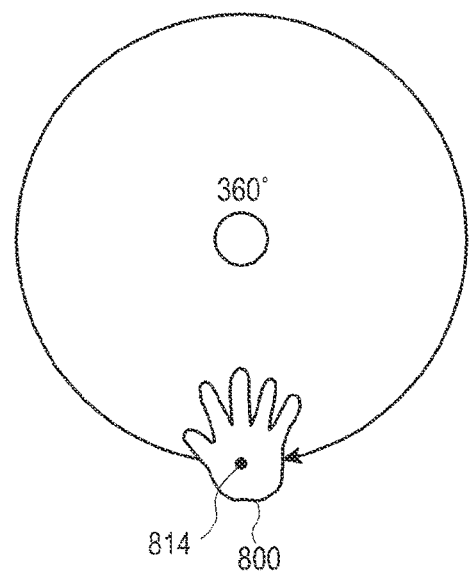

FIG. 8A illustrates a second UI gesture having a center angle of 90°, FIG. 8B illustrates a second UI gesture having a center angle of 180°, FIG. 8C illustrates a second UI gesture having a center angle of 270°, and FIG. 8D illustrates second UI gesture having a center angle of 360°.

In the examples of FIGS. 8A to 8D, the zoom-in magnification is two times when the center angle is 90°, the zoom-in magnification is three times when the center angle is 180°, the zoom-in magnification is four times when the center angel is 270°, and the zoom-in magnification is five times when the center angle is 360°. According to the present example, the user, i.e., the subject 800 can provide a request for a desired zoom-in magnification to the camera apparatus 100 by drawing the second UI gesture corresponding to each magnification with the user's hand. Further, as illustrated in FIGS. 8A to 8D, the subject 800, when the circle drawn by the hand has a center angle corresponding to a desired magnification, the subject 800 can inform the camera apparatus 100 that an input of the second UI gesture has been completed by stopping a motion of the hand in any of positions 801, 802, and 803, respectively, in which the magnification becomes the corresponding center angle. When the motion of the subject 800 is stopped in any of the positions 801, 802, and 803, the controller 140 of the camera apparatus 100 can control the gesture recognizer 120 to estimate the center angle of the circle drawn by the hand of the subject 800. When the center angle is estimated by the gesture recognizer 120, the controller 140 controls the camera 110 to zoom-in the lens with the magnification corresponding to the center angle.

According to another embodiment of the present invention, when the circle drawn by the hand has a center angle corresponding to a desired magnification, the subject 800 can complete an input of the second UI gesture by returning the hand to an original position. When the hand is returned to a corresponding one of the original positions 811, 812, 813, and 814 from the positions 801, 802, and 803 in which the magnification becomes the corresponding center angle, the controller 140 of the camera apparatus 100 controls the gesture recognizer 120 to estimate the center angle of the circle drawn by the hand of the subject 800. When the center angle is estimated by the gesture recognizer 120, the controller 140 controls the camera 110 to zoom-in the lens with a magnification corresponding to the center angle.

Figure 9:
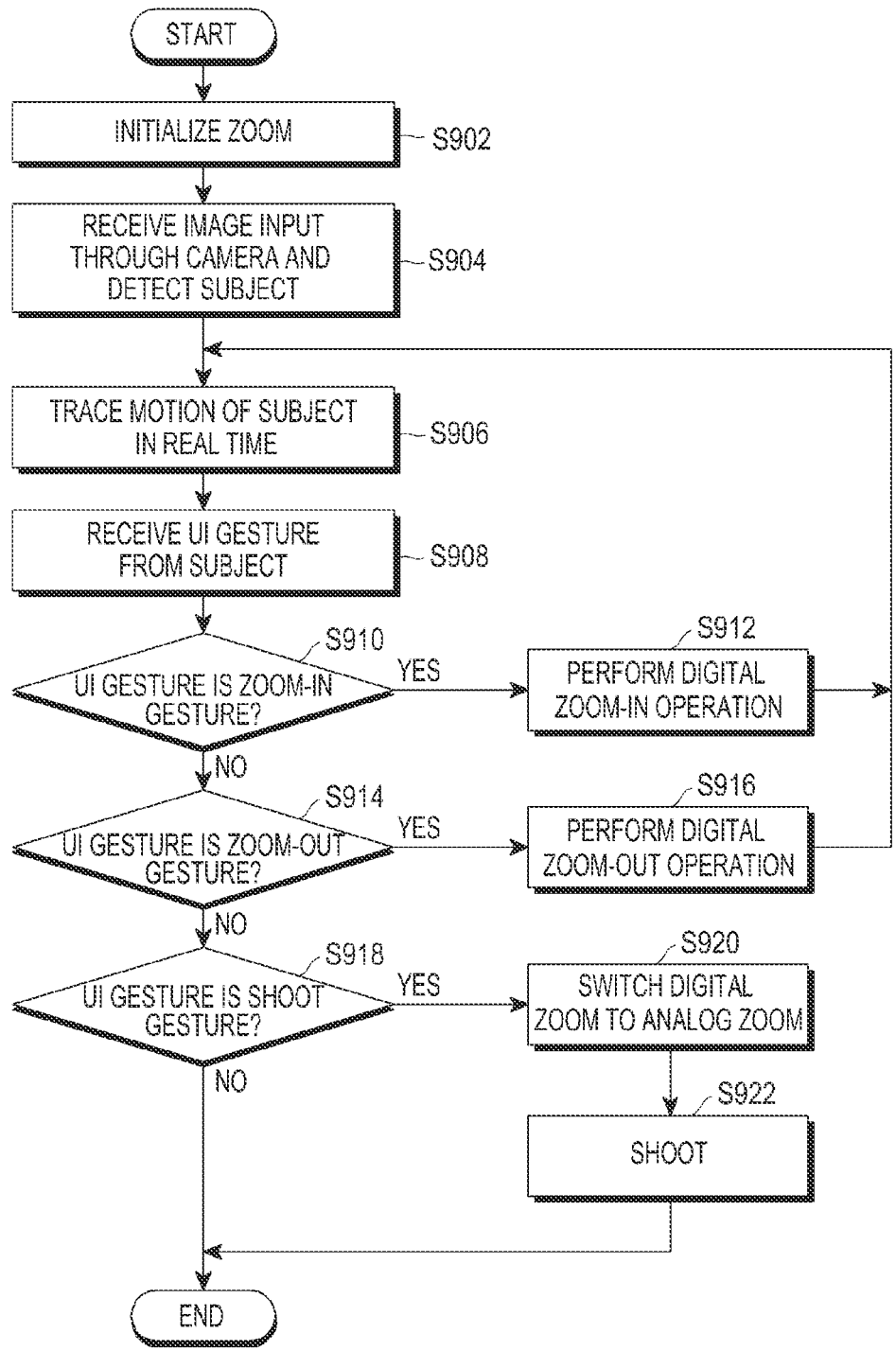
FIG. 9 is a flowchart illustrating another example of the method of controlling the operation of the camera apparatus illustrated in FIG. 1.

FIG. 9 is a flowchart illustrating another example of the method of controlling the operations of the camera apparatus illustrated in FIG. 1.

Referring to FIG. 9, the camera apparatus 100 initializes the zoom-in operation, in step S902. In step S902, the camera apparatus 100 is in a state where the camera 110 is driven and accordingly initializes the zoom of the lens included in the camera 110.

Further, in FIG. 9, the zoom of the camera apparatus 100 may be divided into an analog zoom and a digital zoom. The analog zoom refers to an operation in which the camera apparatus 100 physically moves the lens of the camera 110 in order to increase or reduce a size of the subject within an image input through the lens. The digital zoom refers to an operation of enlarging or reducing at least a part of an image frame generated by the camera 110 in order to increase or reduce a size of the subject within an image input through the lens.

In the present example, when the camera apparatus 100 receives a user input for requesting a zoom-in/out operation from the user, the camera apparatus 100 performs an analog zoom-in/out operation. Further, in the present example, the camera apparatus 100 displays the subject zoomed-in/out using the digital zoom of the digital zoom-in/out on the display unit 154 until the user input for requesting a camera shooting operation is input.

The camera apparatus 100 receives an image input through the camera 100 and detects a subject, in step S904. The camera apparatus 100 traces a motion of the subject in real time, in step S906. The camera apparatus 100 receives the image input through the camera 110 and generates an image frame by using the image. The gesture recognizer 120 can trace, in real time, the motion of the subject by comparing the current frame with at least one previous frame and detecting the motion of the subject.

When the motion traced in real time is the UI gesture, the controller 140 determines that the UI gesture is input from the camera 110. When the camera 110 of the camera apparatus 100 receives the UI gesture from the subject, the controller 140 determines whether the UI gesture is a zoom-in gesture, in step S910.

Upon determining that the UI gesture is the zoom-in gesture, as a result of the determination of step S910 (S910: yes), the controller 140 performs a digital zoom-in operation by controlling the camera apparatus 100, in step S912. Accordingly, an image including the zoom-in subject is displayed on the display unit 154. Thereafter, the camera apparatus 100 continuously receives the UI gesture from the subject by tracing the motion of the subject in real time, in step S906.

Upon a determination that the UI gesture is not the zoom-in gesture as a result of the determination of step S910 (S910: no), the controller 140 determines whether the UI gesture received in step S908 is a zoom-out gesture, in step S914. Upon a determination that the UI gesture is the zoom-out gesture as a result of the determination of step S914 (S914: yes), the controller 140 performs a zoom-out operation with the digital zoom by controlling the camera apparatus 100, in step S916. Accordingly, an image including the zoomed-out subject may be displayed on the display unit 154. Thereafter, the camera apparatus 100 continuously receives the UI gesture from the subject by tracing the motion of the subject in real time, in step S906.

Upon a determination that the UI gesture is not the zoom-out gesture as a result of the determination of step S916 (S916: no), the controller 140 determines whether the UI gesture received in step S906 is a camera shoot gesture in step S918. Upon a determination that the UI gesture is a camera shoot gesture as a result of the determination of step S918 (S918: yes), the controller 140 switches the digital zoom to the analog zoom by controlling the camera apparatus 100, in step S920. For example, when the camera 110 is currently 3× zoomed-in with the digital zoom, the controller 140 controls the camera 110 to be switched to a 3× zoomed-in state with the analog zoom. Thereafter, the camera apparatus 100 performs a shooting operation with the analog zoom, in step S922.

As described above, according to embodiments of the present invention, it is possible to switch the digital zoom to the analog zoom only after the shoot gesture is input. Accordingly, the image frame displayed through the display unit 154 in the processes from step S902 to step S918 of FIG. 9 before the shooting operation may be an image frame processed by the digital zoom.

Further, the images input through the lens of the camera 110 in the processes from step S902 to step S918 of FIG. 9 may be the same regardless of an input of the zoom-in gesture or zoom-out gesture. For example, when a final magnification of the zoom-in/out is determined, the camera apparatus 100 can drive an optical lens of the camera 110 according to the final magnification.

Figure 10:
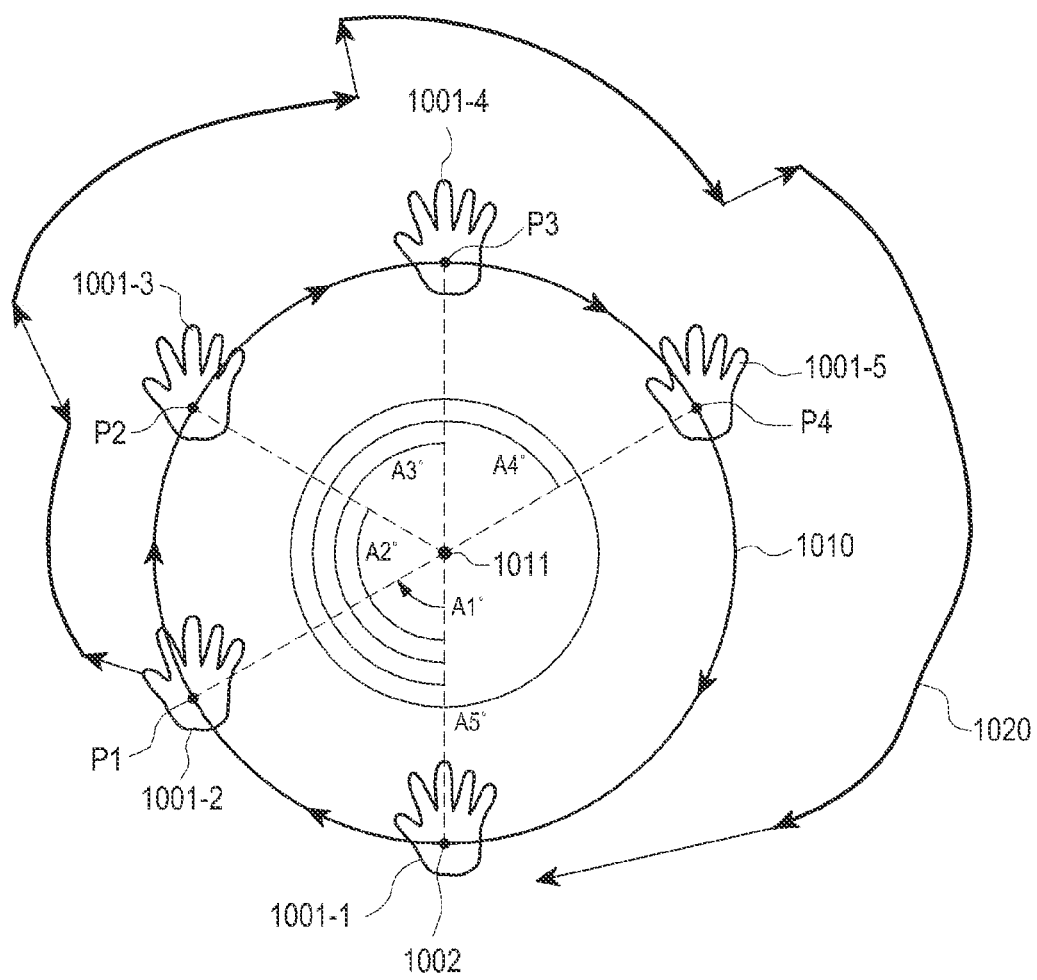
FIG. 10 is a diagram illustrating a motion trace of a UI gesture recognized by a gesture recognizer according to an embodiment of the present invention.
Figure 11:
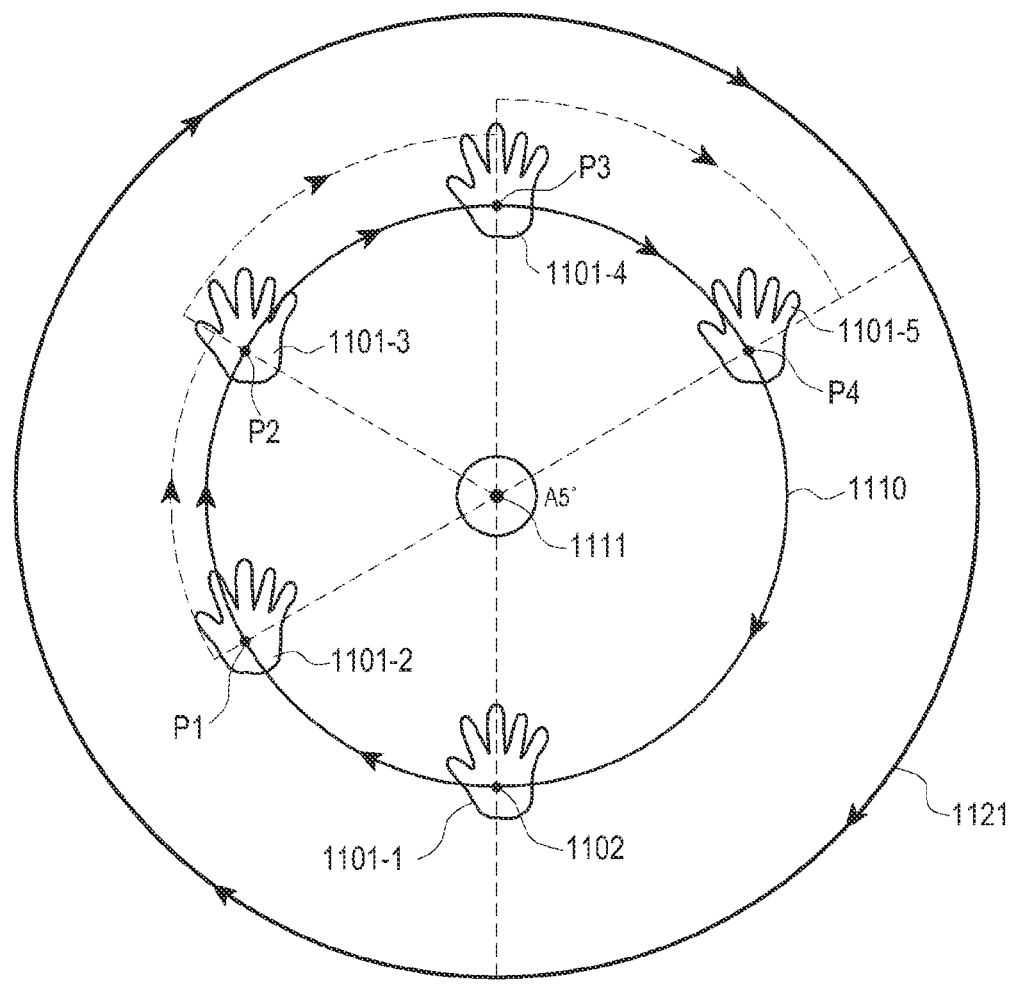
FIG. 11 is a diagram illustrating the motion trace of the UI gesture recognized by the gesture recognizer according to another embodiment of the present invention.

FIG. 10 is a diagram illustrating a motion trace of a UI gesture recognized by the gesture recognizer according to an embodiment of the present invention, and FIG. 11 is a diagram illustrating a motion trace of a UI gesture recognized by the gesture recognizer according to another embodiment of the present invention.

FIGS. 10 and 11 are diagrams illustrating a second UI gesture successively input from the subject and a motion trace of the subject according to the second UI gesture on an image frame.

Referring to FIG. 10, subject 1001, is depicted by hands 1001-1, 1001-2, 1001-3, 1001-4, and 1001-5, which correspond to a single hand at different time points. The subject 1001 successively inputs a circle shape gesture 1010 into the camera apparatus 100 by rotating the hands 1001-1, 1001-2, 1001-3, 1001-4, and 1001-5 clockwise. The camera apparatus 100 determines a zoom-in magnification according to each of center angles determined by each of the hands 1001-1, 1001-2, 1001-3, 1001-4, and 1001-5 making the circle shape gesture 1010. In the example according to FIG. 10, each of the center angles is determined based on a center point 1011 of the circle shape gesture 1010 and a start point 1002 of the circle shape gesture 1010.

In FIG. 10, the zoom-in magnification of the camera 110 is successively changed as the subject 1001 successively makes the circle shape gesture 1010 as the subject 1001 successively moves, as shown by the sequence of hands 1001-1, 1001-2, 1001-3, 1001-4, and 1001-5.

When the hand 1001-2 reaches a first point P1, the controller 140 can control the camera apparatus 100 to perform the zoom-in by a magnification corresponding to a first center angle A1°. Thereafter, when the hand 1001-3 reaches a second point P2. The controller 140 controls the camera apparatus 100 to perform the zoom-in by a magnification corresponding to a second center angle A2°. When the hand 1001-4 reaches a third point P3, the controller 140 controls the camera apparatus 100 to perform the zoom-in by a magnification corresponding to a third center angle A3°. When the hand 1001-5 reaches a fourth point P4, the controller 140 controls the camera apparatus 100 to perform the zoom-in by a magnification corresponding to a fourth center angle A4°.

Since the zoom-in magnification of the camera apparatus 100 is changed in real time while the circle shape gesture 1010 is drawn in real time according to the sequence of hands 1001-1, 1001-2, 1001-3, 1001-4, and 1001-5, the motion trace 1020 drawn by the hands 1001-1, 1001-2, 1001-3, 1001-4, and 1001-5 may not be equal to the circle shape gesture 1010.

When the circle shape gesture 1010 is not equal to the motion trace 1020, the camera apparatus 100 may not correctly recognize the circle shape gesture 1010. Accordingly, in the present invention, the motion trace of the UI gesture may be traced after the UI gesture is completely input by the subject 1100, as illustrated in FIG. 11.

In a manner similar to the example of FIG. 10, in FIG. 11, the subject 1101, depicted by the sequence of hands 1101-1, 1101-2, 1101-3, 1101-4, and 1101-5, successively inputs a circle shape gesture 1110 into the camera apparatus 100 by rotating the subject 1101 in the sequence of hands 1101-1, 1101-2, 1101-3, 1101-4, and 1101-5 clockwise.

In FIG. 11, a zoom-in magnification of the camera 110 is successively changed as the subject 1101 successively makes the circle shape gesture 1110, i.e., as the subject 1101 successively moves according to the sequence of the hands 1101-1, 1101-2, 1101-3, 1101-4, and 1101-5. However, the controller 140 in FIG. 11 stands by until an input of the circle shape gesture is completely input, without driving the lens of the camera 110 in real time.

When the input of the circle shape gesture 1110 is completed by subject 1101 according to the sequence of hands 1101-1, 1101-2, 1101-3, 1101-4, and 1101-5, the gesture recognizer 120 estimates a motion trace 1121 of a subject 1101 based on a position in which the circle shape gesture 1110, i.e., the input of the UI gesture is completed. At this time, the motion trace 1121 is based on a final magnification input according to the circle shape gesture 1110. In the present example, zoom-in magnifications of the circle shape gesture 1110 drawn by the hand 1101-1, 1101-2, 1101-3, 1101-4, and 1101-5 are sequentially "two times→three times→four times→five times→six times". The gesture recognizer 120 can trace the motion trace 1121 by the circle shape gesture 1110 as a motion trace corresponding to the zoom-in magnification of "six times". Accordingly, the controller 140 controls the lens of the camera 110 to be 6× zoomed-in.

Figure 12A:
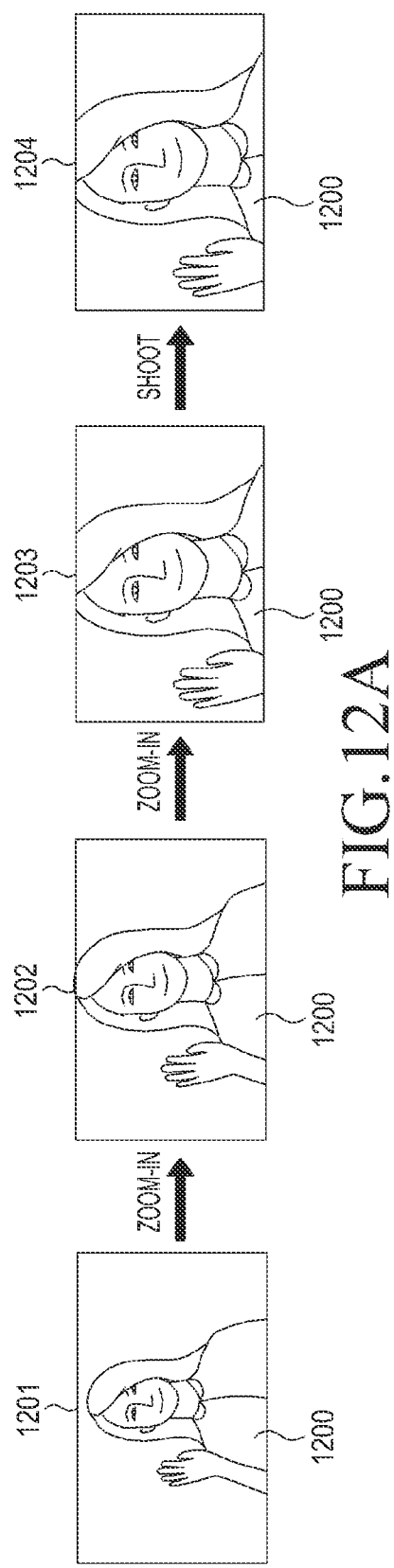
FIG. 12A illustrates an image displayed on a display unit of a camera apparatus operating according to the method illustrated in FIG. 9.
Figure 12B:
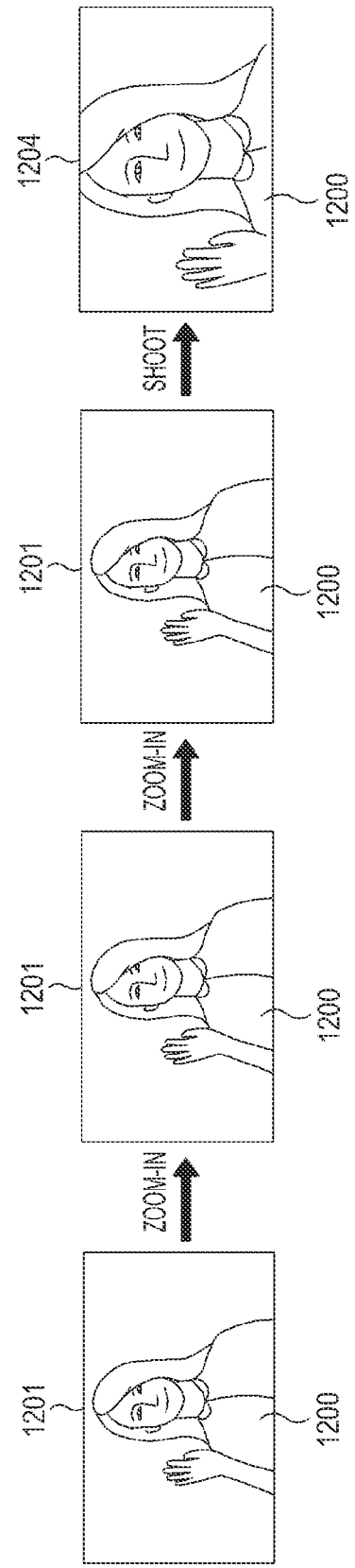
FIG. 12B illustrates an image input and shot by a lens of a camera apparatus according to the method illustrated in FIG. 9.

FIG. 12A illustrates an image displayed on the display unit of the camera apparatus operating according to the method illustrated in FIG. 9, and FIG. 12B is a diagram illustrating an image input and shot through the lens of the camera apparatus. In the present example, the lens of the camera 110 performs analog zoom-in or zoom-out on a subject 1200 through a forward movement or a backward movement, respectively.

Referring to FIG. 12A, an image including the subject is input into the lens of the camera 110, and then a first image frame 1201 is displayed on the display unit 154. When the zoom-in gesture is input by the subject 1200, the controller 140 controls the camera apparatus 100 to perform a digital zoom-in operation of enlarging the first image frame 1201 through software. Accordingly, a second image frame 1201 enlarged from the first image frame 1201 is displayed on the display unit 154. In the present example, the second image frame 1202 is generated by applying a 2× zoom-in magnification to the first image frame 1201 for convenience of description.

In FIG. 12A, the subject 1200 inputs the zoom-in gesture into the camera apparatus 100 one more time after the second image frame 1202 is displayed. The controller 140 controls the camera apparatus 100 to perform a digital zoom-in operation of enlarging the second image frame 1202 again through software. Accordingly, a third image frame 1203 enlarged from the second image frame 1202 is displayed on the display unit 154. In the present example, the third image frame 1203 is generated by applying a 2× zoom-in magnification to the second image frame 1202 for convenience of description. Accordingly, the third image frame 1203 is enlarged from the first frame 1201 four times.

When a shoot gesture is input from the subject 1200 after the third image frame 1203 is displayed, the camera apparatus 100 performs a shooting operation. In the present example, the camera apparatus 100 performs an analog zoom-in operation when a user input for the shooting is input. Accordingly, the controller 140 controls the lens of the camera 110 to have the same magnification as that of the two digital zoom-in operations.

Since the second image frame 1202 is 2× zoomed-in from the first image frame 1201 and the third image frame 1203 is 2× zoomed in from the second image frame 1202, the third image frame 1203 is 4× zoomed in from the first image frame 1201. The controller 140 controls the camera 110 such that the lens is 4× zoomed-in with the analog zoom. The camera apparatus 100 performs the shooting operation to generate a fourth frame 1204 in a state where the lens is 4× zoomed-in. As described above, the camera apparatus 100 according to the present embodiment of the present invention prevents degradation of picture quality due to the digital zoom by switching the digital zoom to the analog zoom and then performing the camera shooting operation.

FIG. 12B illustrates actual images input through the lens of the camera 110 while the digital zoomed-in image frames 1201, 1202, and 1203 are displayed as illustrated in FIG. 12A. Referring to FIG. 12B, the actual image input through the lens may be the same as the first image frame 1201 input before the shoot gesture is input. When the shoot gesture is input from the subject 1200, the camera apparatus 100 performs the analog zoom-in operation to generate the fourth image frame 1204. As described above, the camera apparatus 100 according to the present example may not perform the analog zoom-in/out operation before the shoot gesture is input.

The digital zoom-in/out acquires a zoom effect by enlarging and displaying or reducing and displaying the image frame in a digital processing manner. The digital zoom-in/out can be implemented through software and processed in real time. By contrast, the analog zoom-in/out can be acquired by physically moving the internal or external lens of the camera apparatus 100. Accordingly, the analog zoom-in/out in the camera apparatus 100 requires time taken when the lens physically moves by a distance corresponding to a zoom-in/out magnification. Meanwhile, with respect to a picture quality of the image frame, the analog zoom-in/out is substantially higher than a picture quality achieved by using the digital zoom-in/out. Accordingly, before the user input for the shooting is input, the image frame in which the digital zoom-in/out is processed is displayed on the display unit 154 in order to prevent a processing delay by time taken when the lens of the camera 110 moves. Further, when the user input for the shooting is input, the camera apparatus 100 performs the analog zoom-in/out operation by moving the lens of the camera 110 by the previously digital zoomed-in/out magnification.

Figure 13:
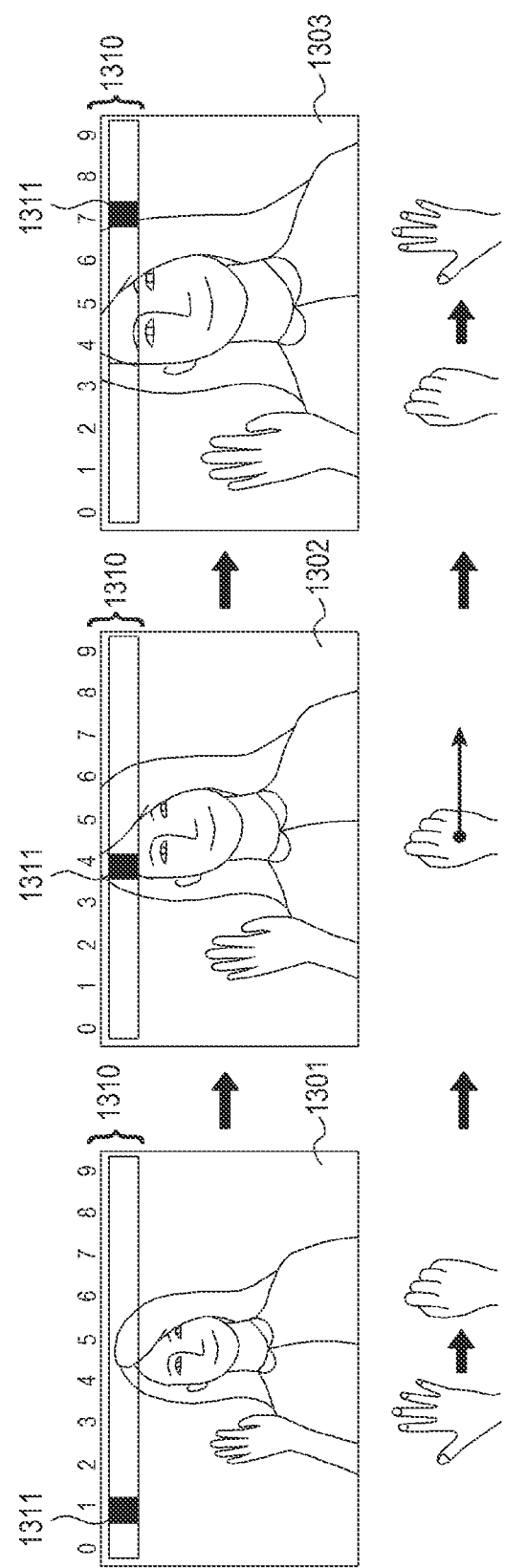
FIG. 13 is a diagram illustrating a successive UI gesture and image processing according to the successive UI gesture according to an embodiment of the present invention.

FIG. 13 is a diagram illustrating a successive UI gesture and image processing according to the successive UI gesture according to an embodiment of the present invention.

The successive UI gesture illustrated in FIG. 13 is associated with the zoom-in/out. A subject 1300 can requests a zoom-in/out operation by completely closing an opened hand, for example, by changing a shape of the hand into a fist shape. When the above UI gesture is input into the camera apparatus 100, a zoom bar 1310 for the zoom-in/out is displayed in upper ends of image frames 1301, 1302, and 1303. The zoom bar 1310 includes at least one number indicating available zoom-in/out magnifications and an identifier 1311 indicating a current magnification. In FIG. 13, the zoom-in/out magnification is indicated by a number above the identifier 1311.

Since the first image frame 1301 corresponds to an original image that has not been zoomed-in/out, a number indicated by the identifier 1311 of the zoom bar 1310 is "1". The subject 1300 moves the identifier 1311 leftward or rightward by moving the closed hand leftward or rightward in a state where the zoom bar 1310 is displayed. In FIG. 13, the subject 1300 moves the closed hand from a left side to a right side. Accordingly, the identifier of the zoom bar 1310 moves in an order of "1→4→7". The second image frame 1302 is an image that is 4× zoomed-in from the first image frame 1301, and the third image frame 1303 is an image that is 7× zoomed-in from the first image frame 1301. The subject 1300 can perform the zoom-in/out operation with a desired magnification by moving the closed hand leftward or rightward. Further, when the subject 1300 is zoomed-in/out with the desired magnification, the subject 1300 can make a request to stop the zoom-in/out operation and/or initiate a camera shooting operation to the camera apparatus 100 by opening the closed hand. In FIG. 13, the subject 1300 requests a camera shooting operation to the camera apparatus 100 by completely opening the closed hand. Accordingly, the camera apparatus 100 stores the third image frame 1303, which is acquired after the subject 1300 moves the lens to be 7× zoomed-in, in the memory 130.

Figure 14A:
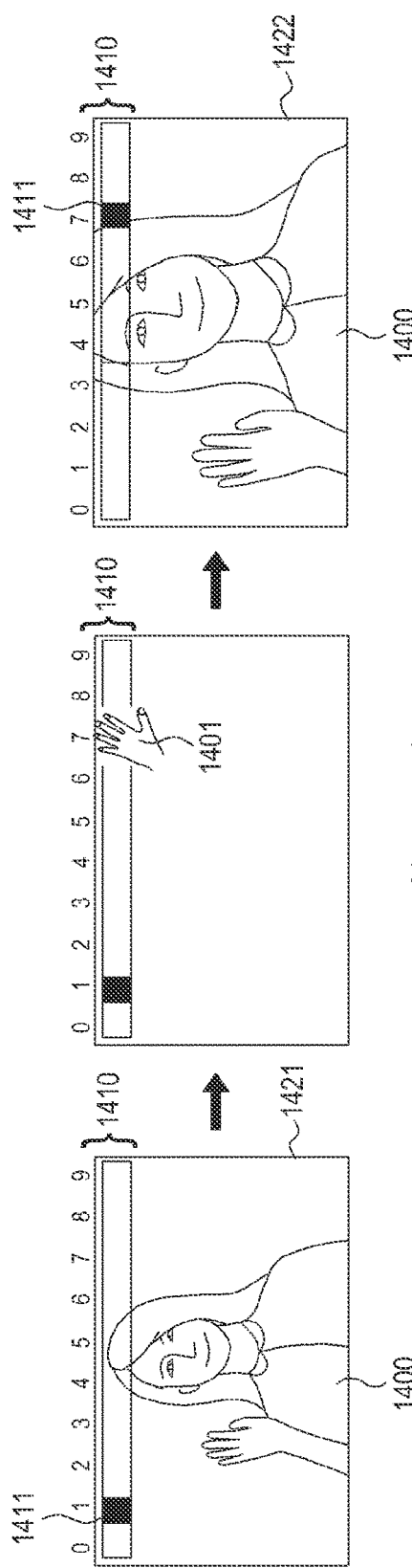
FIGS. 14A and 14B are diagrams illustrating the successive UI gesture and the image processing according to the successive UI gesture according to another embodiment of the present invention.
Figure 14B:
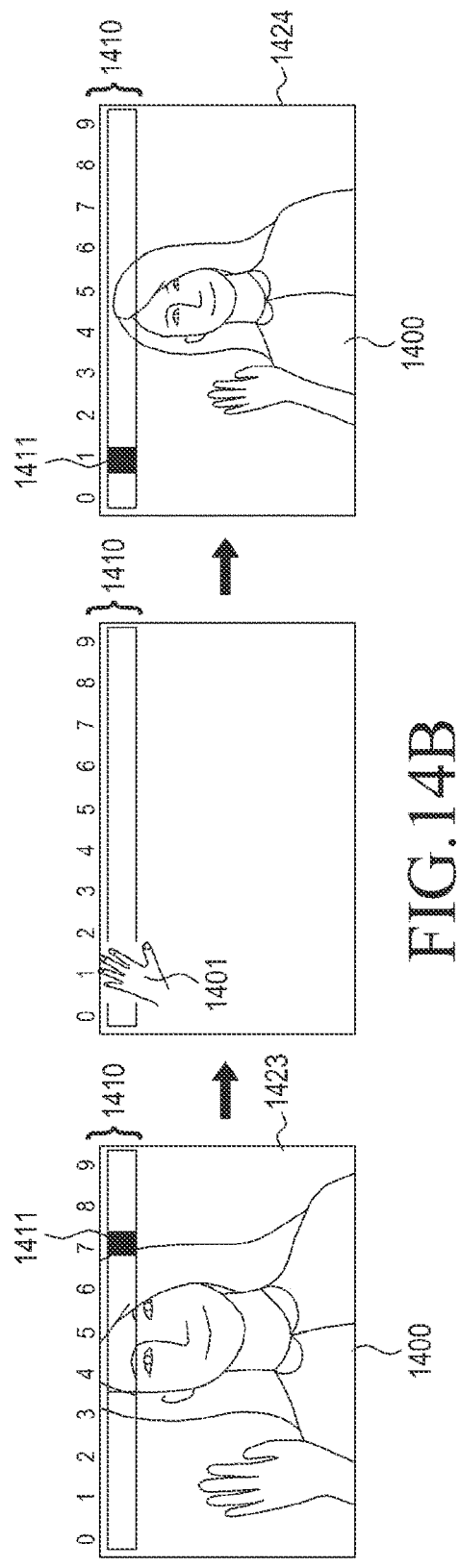

FIGS. 14A and 14B are diagrams illustrating a successive UI gesture and image processing according to the successive UI gesture according to another embodiment of the present invention.

The successive UI gesture illustrated in FIGS. 14A and 14B is also associated with the zoom-in/out like in FIG. 13. In the example according to FIGS. 14A and 14B, a subject 1400 inputs a desired zoom-in/out magnification into the camera apparatus 100 by shaking a completely opened hand 1401 from side to side in a state where a zoom bar 1410 is displayed through the display unit 154. According to an embodiment of the present invention, the hand 1401 may be displayed through the display unit 154 together with a first image frame 1421 and the zoom bar 1410. The present embodiment allows the subject 1400 to input a desired zoom-in/out magnification by displaying the hand 1401, in real time, together with the zoom bar 1410.

In a manner similar to the example according to FIG. 13, the zoom bar 1410 of FIGS. 14A and 14B further include at least one number indicating available zoom-in/out magnifications and an identifier 1411 indicating a current magnification. In FIGS. 14A and 14B, the current zoom-in/out magnification is a number above the identifier 1411.

Since a first image frame 1421 corresponds to an original image that has not been zoomed-in/out, a number indicated by the identifier 1411 of the zoom bar 1410 is "1". The subject 1400 can point to one of numbers displayed in the zoom bar 1410 by shaking the hand 1401 in a state where the zoom bar 1410 is displayed. The number pointed to by the hand 1401 among the numbers displayed in the zoom bar 1410 is input to the camera apparatus 100 as a magnification desired by the subject 1400.

In FIG. 14A, the hand 1401 points to a number "7" displayed in the zoom bar 1410. Accordingly, the subject 1400 inputs "seven times" into the camera apparatus 100 as the zoom-in magnification.

The camera 110 generates a second image frame 1422 in which the subject 1400 of the first image frame 1421 is 7× zoomed-in, and the display unit 154 simultaneously displays the second image frame 1422 and the zoom bar 1411. Since the second image frame 1422 is an image which is 7× zoomed-in in comparison with the first image frame 1421, the identifier 1411 of the zoom bar 1410 indicates a number "7". The identifier 1411 of the zoom bar 1410 indicates a move from "1" to "7".

Referring to a third image frame 1423 in FIG. 14B, the identifier 1411 of the zoom bar 1410 indicates "7". In the example according to FIG. 14B, the third image frame 1423 is 7× zoomed-in from the first image frame 1421 corresponding to the original image. In FIG. 14B, the hand 1401 indicates "1" on the zoom bar 1410. More specifically, for the third image frame 1423 that is 7× zoomed-in in comparison with the 10 first image frame 1421, the subject 1400 inputs "one time" as the zoom-in magnification. The camera 110 accordingly generates a fourth image frame 1424 in which the subject 1400 of the third image frame 1423 is 1× zoomed-in, and the display unit 154 simultaneously displays the fourth image frame 1424 and the zoom bar 1410. Since the fourth image frame 1424 is an image that is ⅟7× zoomed-in in comparison with the third image frame 1423, that is, a 7× zoomed-out image, the identifier 1411 of the zoom bar 1410 indicates "1".

Embodiments of the present invention can be implemented in software, hardware, or a combination thereof Any such software may be stored, for example, in a volatile or non-volatile storage device such as a Read Only Memory (ROM), a memory such as a Random Access Memory (RAM), a memory chip, a memory device, or a memory Integrated Circuit (IC), or a recordable optical or magnetic medium such as a Compact Disc (CD), a Digital Versatile Disc (DVD), a magnetic disk, or a magnetic tape, regardless of whether the memory can be erased or re-recorded. The memory included in the mobile terminal is one example of machine-readable devices suitable for storing a program including instructions that are executed by a processor device to thereby implement embodiments of the present invention. Therefore, embodiments of the present invention may provide a program including codes for implementing a system or method claimed in any claim of the accompanying claims and a machine-readable device for storing such a program. Further, this program may be electronically conveyed through any medium such as a communication signal transferred via a wired or wireless connection, and embodiments of the present invention appropriately include equivalents thereto.

Further, the camera apparatus according to embodiments of the present invention can receive the program from a program providing apparatus connected to the camera apparatus wirelessly or through a wired connection and can store the received program. The program providing apparatus may include a memory for storing a program containing instructions for allowing the camera apparatus to perform a preset content protecting method and information required for the content protecting method, a communication unit for performing wired or wireless communication with the camera apparatus, and a controller for transmitting the corresponding program to the camera apparatus according to a request of the camera apparatus or automatically.

As described above, the present invention provides a method of controlling an operation of a camera apparatus that allows the user to conveniently control an operation of a camera apparatus according to a gesture of a subject input through a lens of a camera, as well as the camera apparatus itself While the present invention has been shown and described with reference to certain embodiments thereof, it will be understood by those skilled in the art that various changes in form and details may be made therein without departing from the spirit and scope of the present invention as defined by the appended claims and their equivalents.

What is claimed is:

1. An electronic device, comprising:
   a camera;
   a memory;
   a display configured to display a first image and a second image captured by the camera; and
   a controller configured to:
     detect, from the first image and the second image, a transition of a shape of a hand of a user between an opened hand and a closed hand, and
     permanently store a third image, captured after detecting the transition of the shape of the hand of the user, in the memory.

2. The electronic device of the claim 1, wherein the controller is further configured to detect the hand of the user from the first image and the second image.

3. The electronic device of the claim 1, wherein the controller detects the transition of the shape of the hand of the user by comparing the first image and the second image with an image stored in the memory.

4. The electronic device of the claim 1, wherein the controller temporarily stores the first image and the second image to be displayed.

5. A method of operating an electronic device, the method comprising:
   capturing a user and displaying a first image and a second image that are captured;
   detecting, from the first image and the second image, a transition of a shape of a hand of the user between an opened hand and a closed hand;
   permanently storing a third image, captured after detecting the transition of the shape of the hand of the user.

6. The method of the claim 5, further comprising:
   detecting the hand of the user from the first image and the second image.

7. The method of the claim 5, wherein detecting the transition of the shape of the hand of the user between the opened hand and the closed hand comprises:
   comparing the first image and the second image with image stored in the memory.

8. The method of the claim 5, further comprising:
   temporarily storing the first image and the second image to be displayed.

* * * * *